United States Patent [19]

Beck et al.

[11] 4,268,773
[45] May 19, 1981

[54] SUPPORT FOR THE FIELD WINDING OF FIELD SPIDERS

[75] Inventors: Edwin Beck, Villnachern; Arthur Stocker, Birr, both of Switzerland

[73] Assignee: BBC Brown, Boveri & Co., Ltd., Baden, Switzerland

[21] Appl. No.: 46,684

[22] Filed: Jun. 8, 1979

[30] Foreign Application Priority Data

Jun. 8, 1978 [CH] Switzerland .......................... 6273/78

[51] Int. Cl.³ .............................................. H02K 1/24
[52] U.S. Cl. ..................................... 310/269; 310/214
[58] Field of Search ........................ 310/269, 270, 214

[56] References Cited

U.S. PATENT DOCUMENTS

| 894,015 | 0/1907 | Kishi et al. | 310/269 |
| 3,766,417 | 10/1973 | Hallenbeck | 310/214 |
| 4,118,646 | 10/1978 | Fleming et al. | 310/269 X |

FOREIGN PATENT DOCUMENTS 2382122 10/1978 France .................................. 310/269

Primary Examiner—Mark O. Budd
Attorney, Agent, or Firm—Burns, Doane, Swecker & Mathis

[57] ABSTRACT

A support device for a field winding of a field spider includes first and second support members which bear at least partially against free coil surfaces of adjacent field coils. The first and second support members mutually support one another against the field coils with various devices provided to urge the first and second support members apart. The support members may either be angled or flat with the flat support members crossing one another.

13 Claims, 8 Drawing Figures

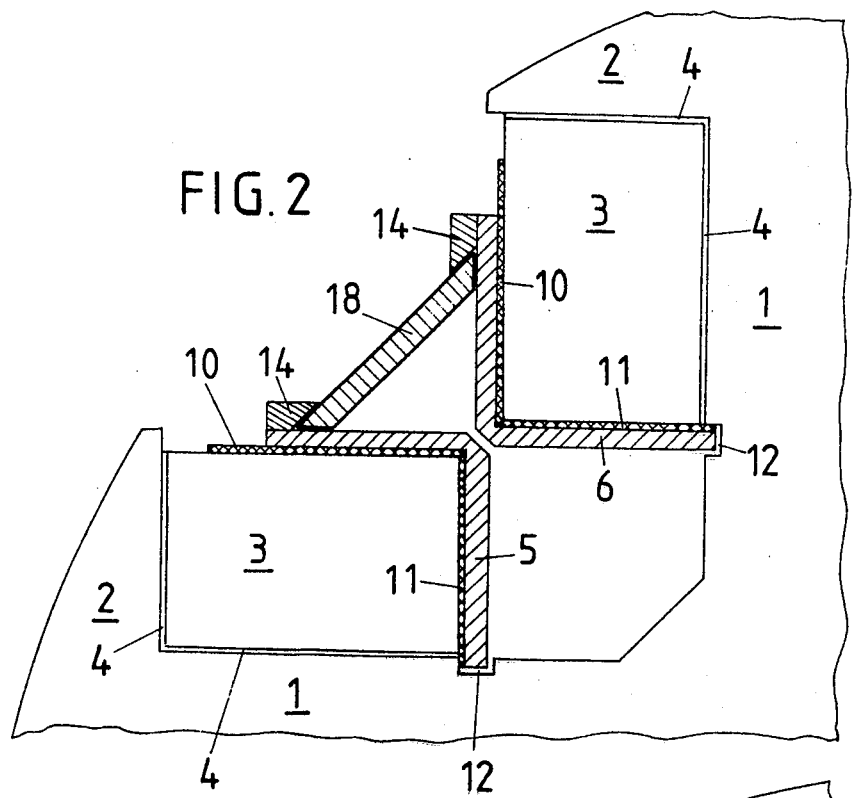
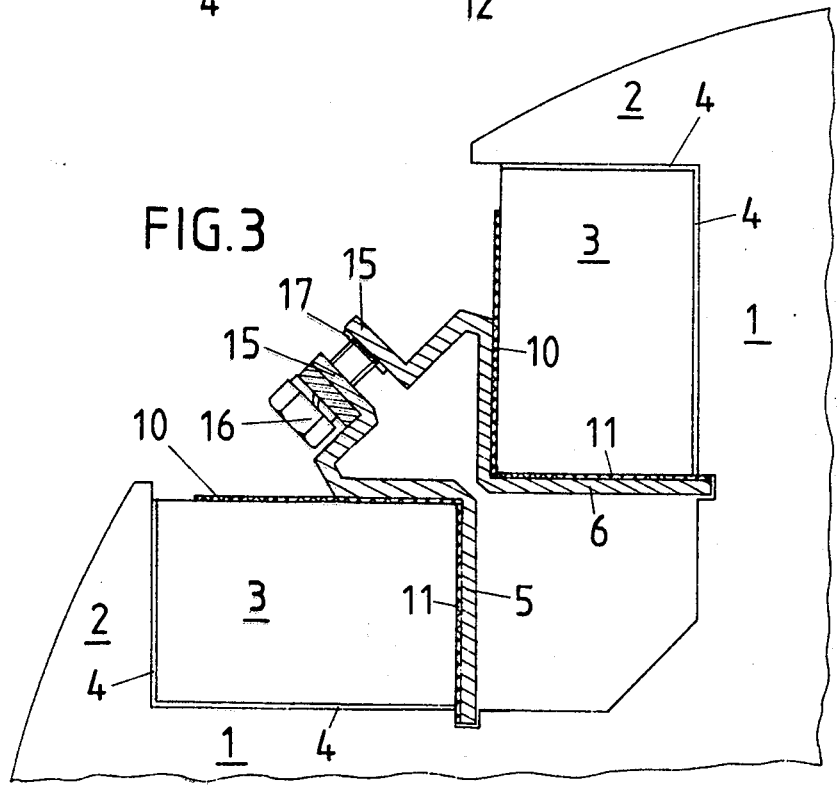

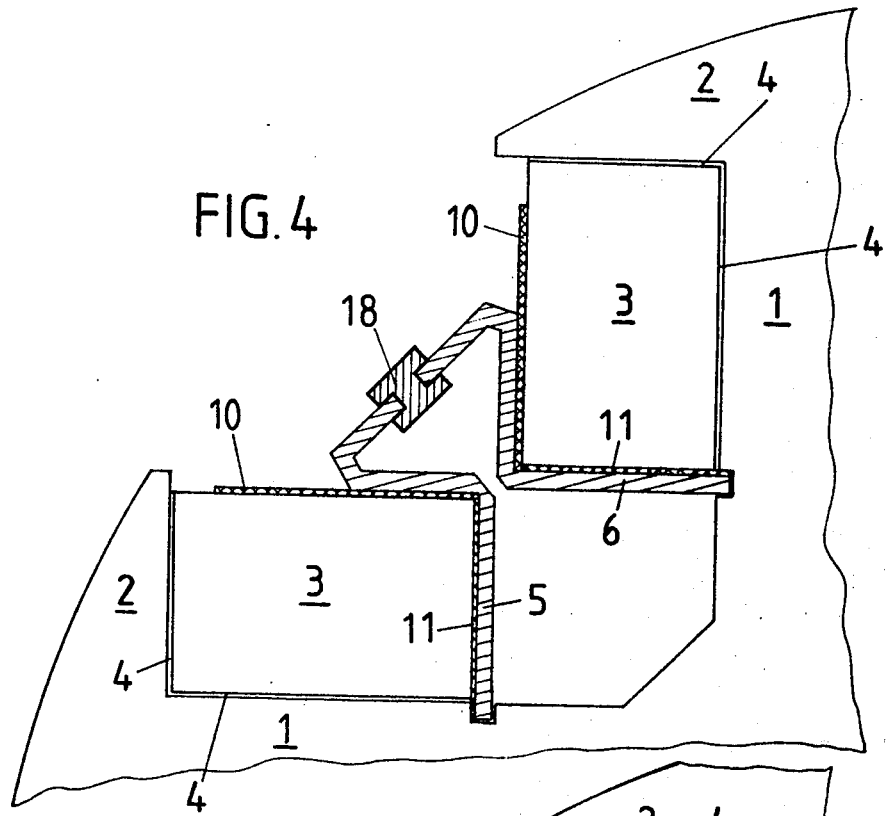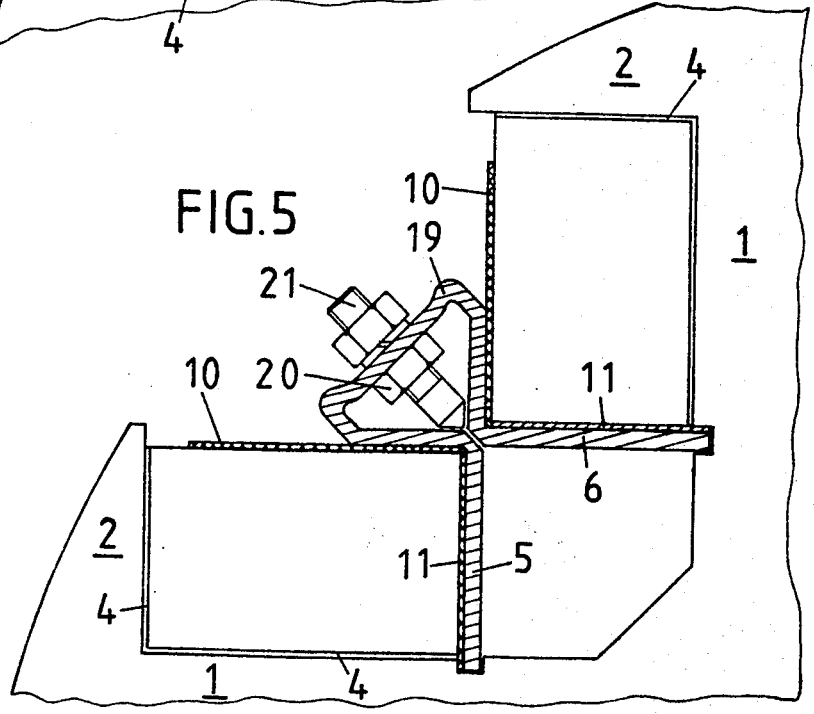

SUPPORT FOR THE FIELD WINDING OF FIELD SPIDERS

BACKGROUND AND SUMMARY OF THE PRESENT INVENTION

The present invention relates to a device for supporting the field winding of field spiders with salient poles.

Supporting devices for the field windings of field spiders with salient poles must essentially satisfy three conditions:

(a) the support device must provide a reliable support in relation to the forces acting during operation of the field spider, (b) the rotor body should not be weakened, if possible, by grooves or bores in which the supporting devices are anchored, (c) the supporting devices should provide as little resistance as possible to the passage of cooling air within the device.

In a supporting device provided for high-speed low-power current generators, known from DE-AS No. 1,199,871, the supporting member is made V-shaped and comprises two resilient arms. The supporting member is pressed in between the field coils under initial tension of the resilient arms. The free ends of the resilient arms support the member, so as to be self-holding, in relation to the pole shoes projecting beyond the field coils, without any further securing.

Such an arrangement is less suitable, however, for larger machines (particularly for 4-pole machines), because the supporting members, which are now right-angled, can no longer fulfill the supporting function by spring force alone. Additional holding devices, for example a support of the radially inner portion of the supporting member on the rotor body, hamper the (axial) passage of cooling air.

It is therefore a primary object of the present invention to provide a supporting device for a field winding of a field spider satisfying the three conditions mentioned at the beginning with the supporting device further distinguished by a simple and economic construction and by an easy assembly.

The problems of the known prior art are solved in that the supporting member according to the present invention comprises support members which are disposed in pairs. The support members bear at least partially against the two free coil surfaces of each field coil and mutually support one another.

In a particular embodiment the support members are angle members which mutually support one another.

Another solution to the above-mentioned problems according to the present invention includes an embodiment having supporting members which comprise two crossed flat members that bear at least partially against the two free coil faces of each field coil. The flat members are gripped in relation to one another or connected to the pole shoe and/or to the pole body.

Both solutions according to the present invention are distinguished by simple and economic construction and ensure a reliable support of the field coils in relation to the centrifugal forces occurring in operation, without the passage of cooling air being adversely affected to an appreciable extent.

In a first more particular embodiment of the present invention, the angle members are gripped in relation to one another by a pressing device consisting of screw bolts and pressing members. The pressing devices are chamfered in a wedge-shape at the surfaces facing one another. This arrangement has the advantage, in particular, that essentially inevitable manufacturing tolerances of the field coils can be taken into consideration without requiring an adaptation of the supporting members. In addition, a tightening of the supporting device is thereby rendered possible at any time.

In a second particular embodiment of the present invention, radially outer ends of the angle members are connected together by a strut. The strut may be welded in place or may be held in place by appropriately shaped guide rails positioned on the outer faces of the angle members. In both cases, the geometry of the arrangement is such that the outer arms of the angle members are urged apart by the strut.

Still another particular embodiment has the ends of the angle members bent towards one another and gripped in relation to one another either by a connecting piece with an H-section or by a screw bolt. In the case of the connecting piece, the mutually supporting surfaces of the angle members and/or of the connecting piece are chamfered in a wedge-shape. Both alternatives render possible the subsequent tightening of the supporting device.

In yet still another form of embodiment the radially outer ends of the angle members are connected to one another by means of a web. The angle members are gripped in relation to one another by means of a threaded bolt which is supported on the web and on the arms of the angle members.

A particular embodiment of the present invention having crossed flat members, permits two different variants of the mutual supporting of the flat members. These variants include the use of a pressing device or the use of welding or other connection of the crossed flat members to the pole shoes and/or to the pole core.

These and other objects and features of the invention will become apparent from the claims and from the following description when read in conjunction with the accompanying drawings.

BRIEF DESCRIPTION OF THE DRAWINGS

Particular embodiments of the present invention are described with reference to the accompanying drawings wherein like members bear like reference numerals and wherein:

FIG. 2 is a cross sectional view of a second embodiment, wherein the field coils are supported in relation to one another by means of angle members with a strut connecting the angle members;

FIG. 3 is a cross sectional view of a third embodiment wherein ends of the angle members are bent towards one another with the ends gripped in relation to one another by a screw bolt;

FIG. 4 is a cross sectional view of a fourth embodiment, wherein the ends of the angle members terminate in a connecting piece having an H-cross-section;

FIG. 5 is a cross sectional view of a fifth embodiment with the angle members connected by a web;

DETAILED DESCRIPTION OF THE PREFERRED EMBODIMENTS OF THE PRESENT INVENTION

With reference to the figures, a section through the field spider of an electrical machine with salient poles is illustrated diagrammatically. The poles, consisting of pole core 1 and pole shoe 2, comprise field coils 3 of flat conductors, profile wire or round wire. Additional particular details of the construction of field coils are described, for example in the book "Konstruktion elektrischer Maschinen" by Wiedemann/Kellenberger, Springer Verlag 1967, pages 320 et seq. which is hereby incorporated by reference. The field coils 3 are electrically insulated from the poles by intermediate insulating layers 4 of glass fabric or the like.

Figure 1:
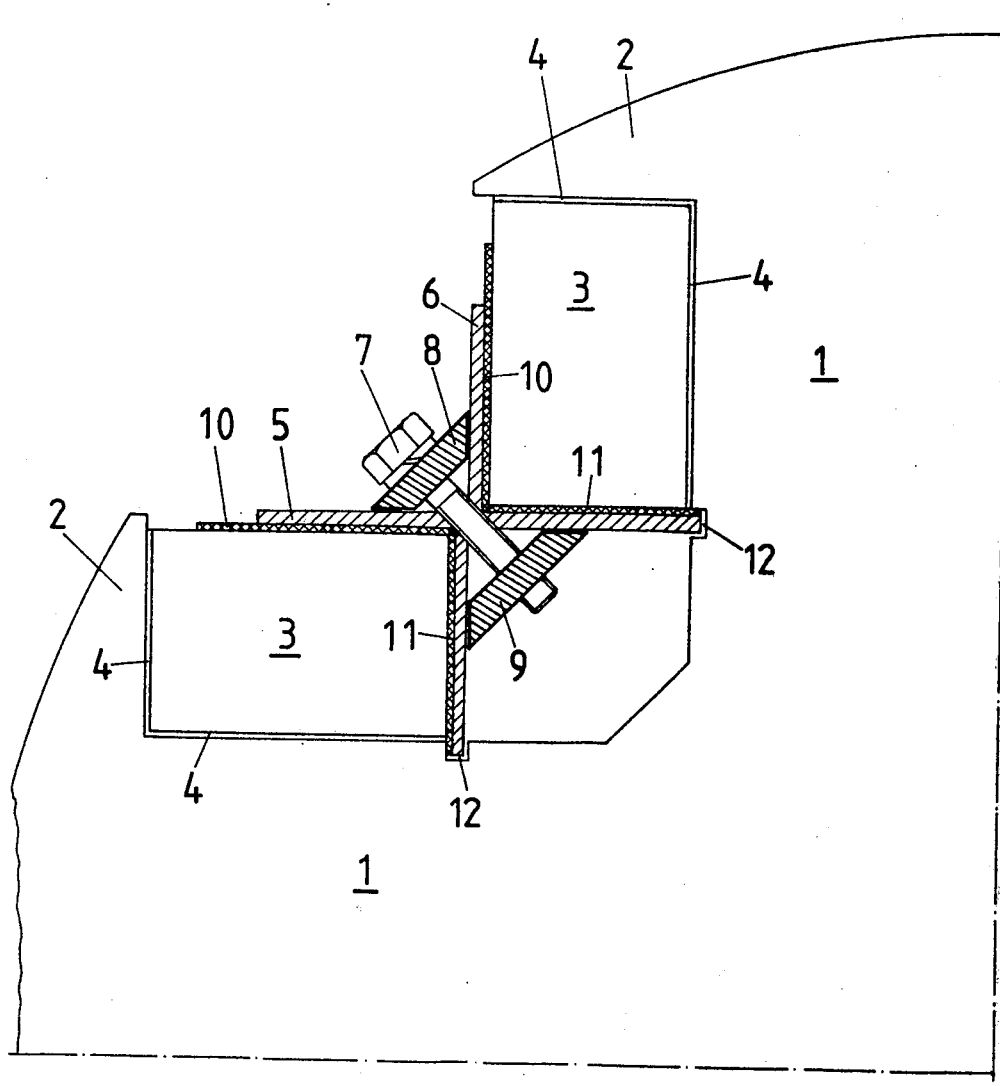
FIG. 1 is a cross sectional view of a first embodiment of a supporting device according to the present invention wherein the field coils are supported in relation to one another by angle members with a pressing device consisting of screw bolts and pressing members provided between the angle members.

With reference now to FIG. 1, resting on the free faces of the field coils 3 are first and second angle members 5, 6 which are gripped in relation to one another by a pressing device. The pressing device includes a screw bolt 7 having two substantially identical pressing members 8, 9 with wedge-shaped chamfers. Insulating elements 10, 11 are provided between the arms of the angle members 5, 6 and the adjacent field coils.

The inner ends of the arms of the angle members may extend beyond the field coils and terminate in corresponding flat grooves 12 in the pole cores 1. The width of the groove is made larger than the thickness of the arm, so as to compensate, if necessary for manufacturing tolerances in the coils or to make allowance for a setting of the field coils after spinning or in operation during the tightening.

It is expressly pointed out that the provision of the grooves 12 and the extension of the ends of the arms of the angle members 5, 6 are not required in the present invention and should only be adopted if necessary.

With reference now to FIG. 2, the mutual supporting of the field coils is provided by a strut 18 which is inserted between the outer arms of the angle members 5, 6. The strut 18 extends substantially at an angle of 45° with respect to the arms. The strut 18 is chamfered in wedge-shape and is held by guide rails 14 provided at the ends of the angle members 5, 6.

The stut 18 may alternatively be welded (not illustrated) to the angle members 5, 6. Furthermore, it may be advisable to spot-weld the strut 18 to the guide rails 14 or to connect the strut and rails rigidly to one another by other arrangement.

In the embodiment shown in FIG. 3, radially outer ends of the angle members 5, 6 are bent towards one another at an angle of about 135° and are provided with strap-like extensions 15. One of the straps is provided with a thread in which a screw bolt 16 is screwed. The end of the screw bolt is received by a recess in the other strap or by a superimposed ring 17. By tightening the screw bolt 16, the radially outer arms of the angle members 5, 6 are urged apart and support the field coils 3 in relation to one another. Here, too, as in the embodiment of FIG. 2, it may be advisable to end in respective grooves 12 in the pole core 1.

In the form of embodiment of FIG. 4, (which may be regarded as a modification of that of FIG. 3) the ends of the arms of the angle members 5, 6 are bent towards one another and terminate in a connecting piece 18 having an H-shaped cross-section. The end faces of the ends of the angle members and possibly the central portion of the connecting piece are preferably chamfered in a wedge-shape (as seen in the direction of the machine axis), to facilitate the tightening of the angle members.

With reference now to FIG. 5, the two angle members 5, 6 are connected to one another by an inwardly arched web 19 which extends substantially parallel with respect to an angle bisector of the arms. A threaded nut 20 is fitted to the inside of the web. The angle members 5, 6 can be parted by a threaded bolt 21 having a conical end to thereby press the field coils against the poles.

Figure 7:
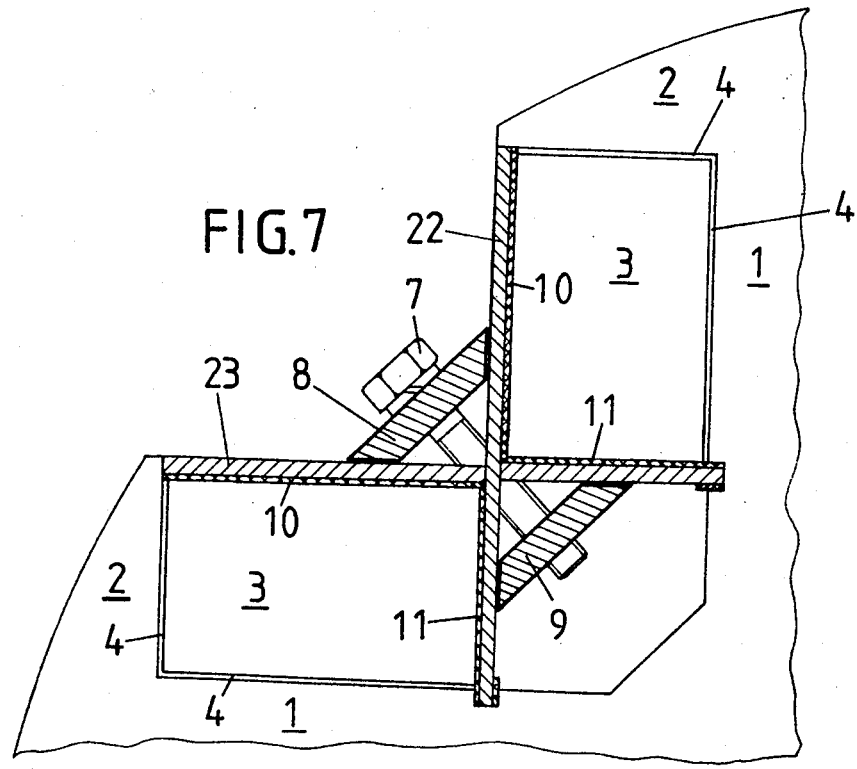
Figure 6:
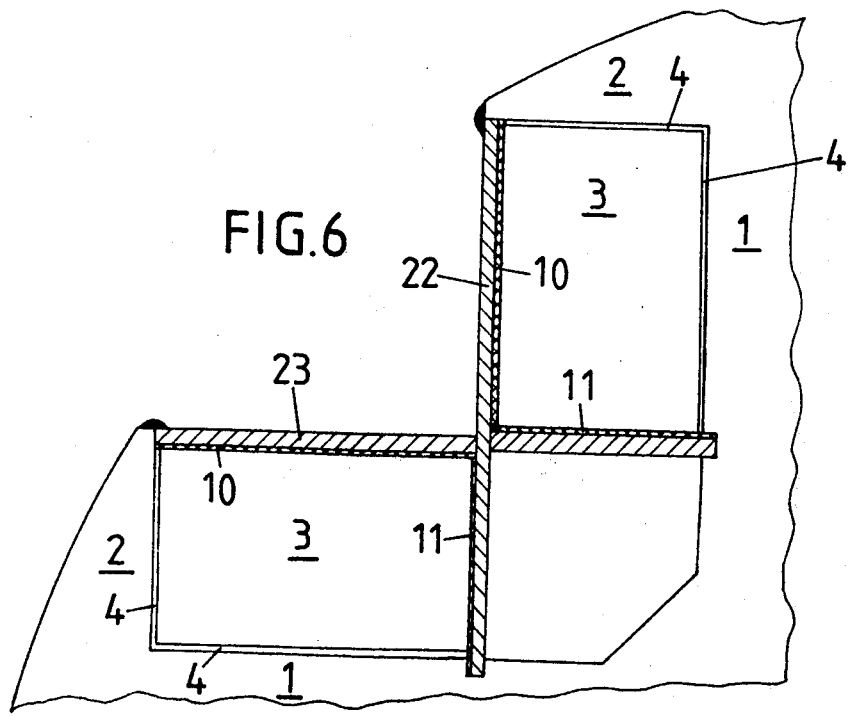
FIG. 6 is a cross sectional view of a sixth embodiment having crossed flat members which are connected to the pole shoe; and, FIG. 7 is a cross sectional view of a seventh embodiment having two crossed flat members gripped in relation to one another by a pressing device.

In the embodiments of FIGS. 6 and 7, the field coils 3 are mutually supported by crossed flat members 22, 23. The radially outer ends of the flat members are welded to the pole shoes in the arrangement of FIG. 6, while in the embodiment according to FIG. 7 a pressing device 7, 8, 9 as described in connection with FIG. 1, serves to mutually grip the flat members. The pressing device 7, 8, 9 when tightened urges the flat members 22, 23 against the field coils 3.

Figure 8:
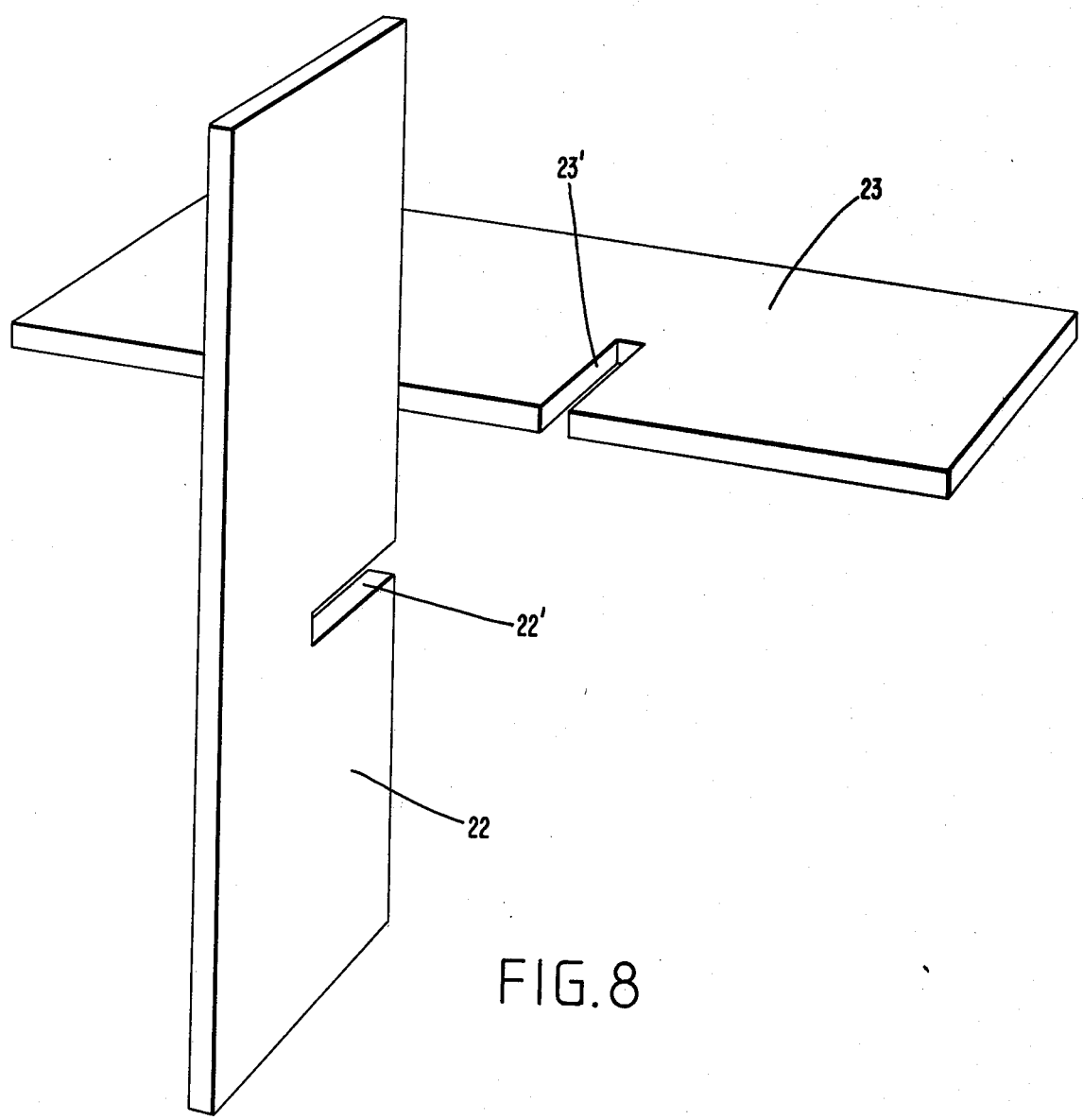
FIG. 8 is a pictorial view of the embodiment of FIG. 6 showing the slots of the two crossed flat members.

The flat members 22, 23 in the arrangement of FIGS. 6 and 7 may be provided with corresponding slots 22', 23', as shown in FIG. 8, so as to be received by one another in an intersecting manner.

As is evident from FIGS. 1 and 7, a passageway is provided between the coils 3 within either the angle members or the flat members so as to permit the bolt 7 to pass therethrough.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the present invention.

What is claimed is:

1. A device for supporting a field winding of a field spider with salient poles, comprising:
a support member adapted to be received between field coils of two adjacent poles, the support member including first and second flat portions which cross one another and which bear against free surfaces of the field coils.

2. The device of claim 1 wherein the first and second flat portions are fixed with respect to one another.

3. The device of claim 1 wherein the first and second flat portions are fixed with respect to a respective pole shoe of the field spider.

4. The device of claim 1 wherein the first and second flat portions are fixed with respect to a respective pole core of the field winding.

5. A device for supporting a field winding of a field spider with salient poles, comprising:
a support member adapted to be received between field coils of two adjacent poles, the support member including first and second angled portions which bear against free surfaces of the field coils; and
pressing means for mutually supporting the first and second angled portions with respect to one another and against the free surfaces of the field core, the pressing means including a strut extending substantially parallel to an angle bisector of the first and second angled portions, the strut being operatively connected to ends of the first and second angled portions.

6. A device for supporting a field winding of a field spider with salient poles, comprising:
a support member adapted to be received between field coils of two adjacent poles, the support member including first and second angled portions which both mutually support one another and bear against free surfaces of the field coils, and wherein radially outer ends of the first and second angled portions are bent towards one another and connected to one another at the radially outer ends.

7. A device for supporting a field winding of a field spider with salient poles, comprising:
a support member adapted to be received between field coils of two adjacent poles, the support member including first and second angled portions which both mutually support one another and bear against free surfaces of the field coils, and wherein the first and second angled portions are connected to one another at the radially outer ends by a connecting member having a cross section in the form of an H, the connecting member being provided between the radially outer ends of the first and second angled portions.

8. A device for supporting a field winding of a field spider with salient poles, comprising:
a support member adapted to be received between field coils of two adjacent poles, the support member including first and second angled portions which bear against free surfaces of the field coils; and
pressing means for mutually supporting the first and second angled portions with respect to one another and against the free surfaces of the field core, and wherein the pressing means includes a screw bolt, the first and second angled portions having radially outer ends bent towards one another with the screw bolt carried by one of said radially outer ends, an end of the screw bolt urging the other of said radially outer ends away from said one radially outer end.

9. The device of claim 6 further comprising a screw bolt carried by said first and second angled portions at the radially outer ends and directed radially inwardly, the screw bolt urging the first and second angled portions away from one another and against the respective free surfaces of the field coils.

10. The device of claim 3 further comprising:
pressing means for mutually supporting the first and second flat portions with respect to one another and against the free surfaces of the field core, the pressing means including a screw bolt and first and second pressing members, the pressing members being arranged on either side of the first and second flat portions with the screw bolt urging the pressing members towards one another.

11. A device for supporting a field winding of a field spider with salient poles, comprising:
a support member adapted to be received between field coils of two adjacent poles, the support member including first and second angled portions which bear against free surfaces of the field coils, and wherein radial ends of the first and second angled portions terminate in grooves of a pole core.

12. A device for supporting a field winding of a field spider with salient poles, comprising:
a support member adapted to be received between field coils of two adjacent poles, the support member including first and second angled portions which bear against free surfaces of the field coils, and wherein radial ends of the first and second angled portions terminate in grooves of a pole shoe.

13. The device of claims 3, 5, 6, 7, 8, 11 or 12 further comprising:
insulating means for insulating said support member with respect to the free surfaces of the field coils.

* * * * *